United States Patent
Ellis et al.

(10) Patent No.: US 8,161,372 B2
(45) Date of Patent: Apr. 17, 2012

(54) EXTENSIBLE VALUE TYPES IN CELLS

(75) Inventors: Charles D. Ellis, Seattle, WA (US); Matthew J. Androski, Bellevue, WA (US); Robert G. Hawking, Seattle, WA (US); Simon Peyton Jones, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 999 days.

(21) Appl. No.: 11/297,991

(22) Filed: Dec. 9, 2005

(65) Prior Publication Data
US 2007/0136652 A1   Jun. 14, 2007

(51) Int. Cl.
*G06F 17/00* (2006.01)
(52) U.S. Cl. .......................... 715/212; 715/219
(58) Field of Classification Search ............... 715/212, 715/219, 220, 209, 210
See application file for complete search history.

(56) References Cited

U.S. PATENT DOCUMENTS

| | | | | |
|---|---|---|---|---|
| 5,598,519 | A | 1/1997 | Narayanan | 715/219 |
| 6,119,130 | A | 9/2000 | Nguyen et al. | 707/203 |
| 6,138,130 | A * | 10/2000 | Adler et al. | 715/210 |
| 6,502,111 | B1 | 12/2002 | Dussud | 1/1 |
| 6,693,652 | B1 * | 2/2004 | Barrus et al. | 715/838 |
| 6,701,485 | B1 | 3/2004 | Igra et al. | 715/503 |
| 6,779,151 | B2 * | 8/2004 | Cahill et al. | 715/210 |
| 6,988,241 | B1 | 1/2006 | Guttman et al. | 715/503 |
| 7,017,112 | B2 | 3/2006 | Collie et al. | 715/513 |
| 7,099,890 | B2 | 8/2006 | Cahill et al. | 707/103 |
| 7,155,665 | B1 | 12/2006 | Browne et al. | 715/503 |
| 7,310,719 | B2 | 12/2007 | Von Bergen et al. | 711/170 |
| 2002/0091871 | A1 | 7/2002 | Cahill et al. | 709/315 |
| 2004/0103366 | A1 | 5/2004 | Peyton-Jones et al. | 715/213 |
| 2004/0172592 | A1 | 9/2004 | Collie et al. | 715/503 |
| 2005/0015714 | A1 | 1/2005 | Cahill et al. | 715/503 |
| 2005/0210389 | A1 * | 9/2005 | Middelfart | 715/730 |
| 2006/0036656 | A1 * | 2/2006 | Mercer | 707/203 |
| 2006/0036939 | A1 | 2/2006 | Hobbs et al. | 715/213 |
| 2006/0080594 | A1 | 4/2006 | Chavoustie et al. | 715/503 |
| 2006/0095833 | A1 | 5/2006 | Orchard et al. | 715/209 |
| 2006/0117302 | A1 * | 6/2006 | Mercer et al. | 717/131 |
| 2006/0161844 | A1 | 7/2006 | Simkhay et al. | 715/212 |
| 2006/0212469 | A1 | 9/2006 | Babanov et al. | 707/102 |
| 2006/0224946 | A1 | 10/2006 | Barrett et al. | 715/503 |
| 2007/0061698 | A1 | 3/2007 | Megiddo et al. | 715/210 |
| 2009/0006466 | A1 | 1/2009 | Ellis et al. | 707/103 R |

OTHER PUBLICATIONS

Kurt W. Piersol, "Object Oriented Spreadsheets: The Analytic Spreadsheet Package," OOPSLA '86 Proceedings, pp. 385-390 (Sep. 1986).*

(Continued)

*Primary Examiner* — Adam M Queler
(74) *Attorney, Agent, or Firm* — Merchant & Gould

(57) ABSTRACT

Individual cells within a spreadsheet may contain an extensible value as defined by an extensible value type. The extensible value type is a user defined value type that is incorporated into the spreadsheet as a supported data type. Generally, the extensible data types provide support for types that are not internally defined by a spreadsheet. When the extensible value type is defined, an associated set of functions are developed to operate on the type. These functions are added to the set of base functions supported by the spreadsheet. The functions, therefore, behave in a substantially similar manner to the set of base spreadsheet functions. The extensible values that are contained within the cells may be acted upon in the same way that supported base types are acted upon.

20 Claims, 5 Drawing Sheets

OTHER PUBLICATIONS

Microsoft; "*Import, Export, and Link Data between Access and Excel*"; http://office.microsoft.com/en-us/access/HP010950951033.aspx#jmp_exportACdataToXL; 2007; pp. 1-16.

Prime 2s LLC; "*3-Clicks Excel Add-In*"; http://www.prime2s.com/3-Clicks/index.html; 2007; 1 pg.

Office Action issued Aug. 29, 2011, in U.S. Appl. No. 12/135,913.
Office Action dated Dec. 26, 2011, issued in CN Application No. 200680046424.5, *w/translation*.
Office Action issued Sep. 23, 2009, in U.S. Appl. No. 12/135,913.
Office Action issued Mar. 24, 2010, in U.S. Appl. No. 12/135,913.
Office Action issued Feb. 2, 2012, in U.S. Appl. No. 12/135,913.

\* cited by examiner

EXTENSIBLE VALUE TYPES IN CELLS

BACKGROUND

Spreadsheet software applications are used by many different users for manipulating data. Typical spreadsheet applications simulate physical spreadsheets by capturing, displaying, and manipulating data arranged in rows and columns. At the intersection of the columns and the rows are cells. Cells within spreadsheets can contain values such as a number, a string, and an error. Furthermore, cells may also contain formulas that can operate on the values in other cells and display the results. These formulas empower the user to create calculations and business logic that helps the user exploit the data.

Spreadsheets today, however, are limited to the types of data or information that the spreadsheet can capture or manipulate. For example, spreadsheets are currently able to display a currency as dollar sign followed by a number, or as a British Pound symbol followed by a number, but unable to specify how currency values are to be manipulated in mathematical formulas differently from numerical values. Thus, when performing operations on the data, the spreadsheet may fail to notify users of logical inconsistencies, for example when a user adds pounds to dollars.

In other cases, users wish to perform operations on more complex types of data. Currently this is achievable only by using multiple cells and formulas within a spreadsheet.

In yet another set of cases, users wish to perform operations in a spreadsheet on arbitrary data types which are not reducible to multiple cells containing simpler data types. In these cases, spreadsheets lack a way of containing certain types of data, for example a picture or a COM object, such that they can be operated on and passed by formulas, and lack the extensibility such that a developer could create new functions to operate on these arbitrary value types.

As such, spreadsheets offer limited functionality in terms of the types of data they allow.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Individual cells within a spreadsheet may contain an extensible value as defined by an extensible value type. The extensible value type is a user defined value type that is incorporated into the spreadsheet and supported by the spreadsheet as the other data types. Generally, the extensible data types provide support for types that are not internally defined by a spreadsheet. For example, an extensible value type may include, but is not limited to: a matrix extensible value type; a vector extensible value type; a finance yield curve extensible value type; a picture extensible value type; a complex number extensible value type, a number with units extensible value type, and the like. When the extensible value type is defined by the user, an associated set of functions are also developed by the user that operate on the type. These functions are added to the set of base functions supported by the spreadsheet. The functions, therefore, behave in a substantially similar manner to the set of base spreadsheet functions. In other words, the extensible values that are contained within the cells may be acted upon in the same way that supported base types are acted upon. The extensible value type may also define how an extensible value may be regarded as a built-in value, such that the base spreadsheet functions may act upon the extensible value.

DETAILED DESCRIPTION

Figure 1:
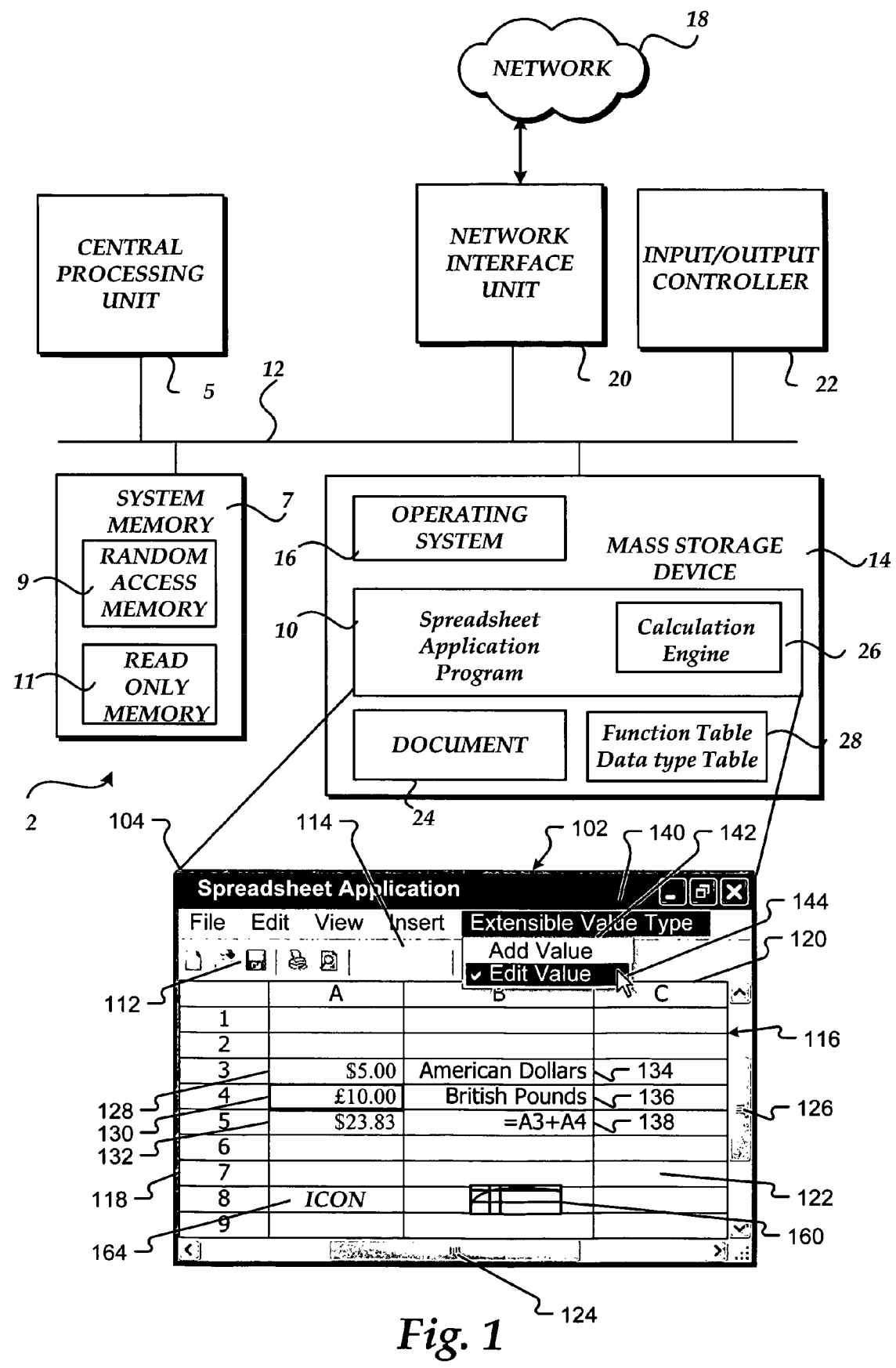
FIG. 1 illustrates an exemplary computing architecture for a computer.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Throughout the specification and claims, the following terms take the meanings explicitly associated herein, unless the context clearly dictates otherwise.

The term "cell" is a location in the rectangular grid of a spreadsheet. A cell can contain information such as: a formula or literal value; a value (either base or extensible), computed by the formula (if any); metadata, or cell properties, such as: information to format the cell itself (cell background, borders etc); information to format the value of the cell (font, bold, number formats etc); data validation; and protection.

The term "value" refers to the value computed by a formula. A value may live in a cell, but it may also be an intermediate value in a formula, and hence have no associated cell. A value may be a "base value" defined by the spreadsheet itself, such as: a number, a text string, an error value, an array; or it may be an "extensible value" defined by the user. A value does not have formatting information associated with it.

The term "MDX" refers to the MultiDimensional eXpressions language.

The term "cube" refers to a multi-dimensional OLAP database from which data may be retrieved. The term "member" is a value along one of the cube's dimensions.

The term "tuple" is the intersection of one or more members in a cube, with only one member from each dimension. The tuple represents the slice of the cube that includes the specified members.

Briefly described, cells within a spreadsheet may contain an extensible value of an extensible value data type. The ability to store extensible values within the individual cells enables the spreadsheet program to act on an extensible value in the same way that a supported base value is acted upon. For example, assuming a picture has been defined as an extensible value type then a picture value could be included in one or more of the cells and acted upon using the base spreadsheet functions and/or the functions that were created to operate on pictures. An extensible value may range in size from a value that is easily contained within a cell to a value that requires a large amount of storage and may not be easily shown within a cell. A value that is easily contained within a cell may be something such as numbers-with-units, numbers-with-currency, MDX members, and the like. A value that may not be easily contained within a cell may be something such as a yield curve, a picture, an array, database relations, and the like.

Referring now to FIG. 1, an exemplary computer architecture for a computer 2 utilized in various embodiments will be described. The computer architecture shown in FIG. 1 may be configured in many different ways. For example, the computer may be configured as a server, a personal computer, a mobile computer and the like. As shown, computer 2 includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, the computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments, the computer 2 operates in a networked environment using logical connections to remote computers through a network 18, such as the Internet. The computer 2 may connect to the network 18 through a network interface unit 20 connected to the bus 12. The network interface unit 20 may also be utilized to connect to other types of networks and remote computer systems.

The computer 2 may also include an input/output controller 22 for receiving and processing input from a number of devices, such as: a keyboard, mouse, electronic stylus and the like. Similarly, the input/output controller 22 may provide output to a display screen, a printer, or some other type of device (not shown).

As mentioned briefly above, a number of program modules and data files may be stored in the mass storage device 14 and RAM 9 of the computer 2, including an operating system 16 suitable for controlling the operation of a networked computer, such as: the WINDOWS XP operating system from MICROSOFT CORPORATION; UNIX; LINUX and the like. The mass storage device 14 and RAM 9 may also store one or more program modules. In particular, the mass storage device 14 and the RAM 9 may store a spreadsheet application program 10, such as the MICROSOFT EXCEL spreadsheet application. According to one embodiment, the spreadsheet application 10 is operative to provide functionality for interacting with extensible value types whose values are entered into one or more cells of spreadsheet application 10. The spreadsheet 10 is configured to operate on any extensible value type as if the extensible value was a single value that is one of the supported base types.

The spreadsheet application 10 is configured to receive user input. For example, a user enters item data into a spreadsheet via a graphical user interface. The user input can be a single value, an extensible value, item data, item metadata, function information, cube function information, or other data. The user input may be direct input created by the user typing, pasting, or other deliberate action entering data into the spreadsheet or indirect input that may be generated by another program.

Calculation engine 26 performs operations relating to the cells within the spreadsheet. According to one embodiment, calculation engine 26 is a component within the spreadsheet application 10. The calculation engine 26, however, may be located externally from the spreadsheet application 10. The operations performed by calculation engine 26 may be mathematical, such as summation, division, multiplication, calculations on extensible values, etc., or may include other functions or features, such as interacting with a multidimensional data store. Calculation engine 26 may be configured to perform many different operations.

Spreadsheet application 10 shows an exemplary spreadsheet window 104 that includes spreadsheet 116. The spreadsheet 116 is formed by intersecting rows, such as row 7 118, and columns, such as column C 120. The intersecting rows and columns form cells, such as cell C7 122, which are identified by the cell's corresponding column and row, e.g., cell C7 122 is in column C 120 and row 7 118. As shown, spreadsheet 116 has three columns and nine rows. Spreadsheet 116, however, may include many more rows and columns as represented by the scroll bars 124 and 126. Spreadsheet program 10 may also include user interface elements to interact with the extensible value types. For example, drop down menu 140 shows a menu for adding an extensible value 142 and editing an extensible value 144. According to another embodiment, the user may select another UI element, such as a dropdown, to choose from a list of available extensible data types to assist in populating the cell and/or formula. As illustrated, the spreadsheet includes cells that contain standard cell values, such as text 124 and 136, and extensible values such as the monetary values in cells A3-A5 a picture value 164 in cell A8, and a yield curve value 160 in cell B8. An extensible value may not always be able to be displayed in its entirety within a cell of a spreadsheet. For example, any extensible value that includes many values may not be shown in its entirety within a single cell. As such, when the extensible value type is defined, a DisplayYourself( ) definition is included that defines how the extensible value type is to be displayed within a cell. In the present example, the monetary values are displayed with their monetary symbols, a picture is displayed as an ICON, and a yield curve has a small representation of the yield curve that is included within the cell. In addition to defining how the extensible value is shown within a cell, the extensible value definition also includes a PopUp-Viewer( ) definition that defines how the extensible value is viewed and edited in its entirety. According to one embodiment, when an extensible value is selected that is not a value that is computed by a formula, a viewer is displayed that may be used to view and edit the extensible value. Alternatively, when the extensible value displayed is computed by a formula and the user edits the extensible value, then the extensible value becomes a constant value. According to another embodiment, any extensible value that is calculated by a formula may be viewed within the viewer but not edited. The viewer may be a custom viewer that is developed specifically for the extensible value or the viewer may be a third-party product that operates on the extensible value type. For example, the viewer may be an already developed graphics program that supports standard image types when the extensible value is a picture. Similarly, when the extensible value contains XML, the viewer may be a standard XML editor.

A cell is both a display and a container within the spreadsheet. As such, each cell can display an item and contain the item. In the present example, a monetary extensible value type has been defined to act on various currencies, such as British and American currencies. The monetary extensible value type definition is stored within data type table 28 along with the functions 28 that operate on the monetary values that are defined by the monetary extensible value type. Function and data type table 28 may also include the functions and data types already supported by the spreadsheet, including all of the standard base functions. According to one embodiment, the standard operators may be overridden by an extensible value type function. In the present example, the plus "+" operator is overridden such that it may be used to add two monetary extensible values.

For example, cell A3 128 displays the item "$5.00," which represents a monetary value contained by the cell A3 128. Cell A4 130 displays the monetary value "£10.00," and cell A5 displays the monetary value "$23.82." Cell A4 130 contains the item having a monetary value that represents the displayed "£10.00" shown in the cell. Contrary to cells A3 128 and A4 130, cell A5 132 contains an item that is a formula, "=A3+A4," which instructs the spreadsheet to calculate the sum of the monetary value contained in cell A3 with the monetary value contained in cell A4 and return and display the result in cell A5. As can be seen, function 138, which is a function developed in conjunction with the extensible value type definition, used the plus "+" operator to add the two monetary extensible values to produce the result in American dollars. In order to perform the addition of the currencies, no metadata was required to perform the calculation and produce the result. The extensible value is a value and not just a reference to another cell. In embodiments, the items in the cells are from various user input into the spreadsheet, such as the user manual typing the value or the user copying and pasting the value into the cell.

Figure 2:
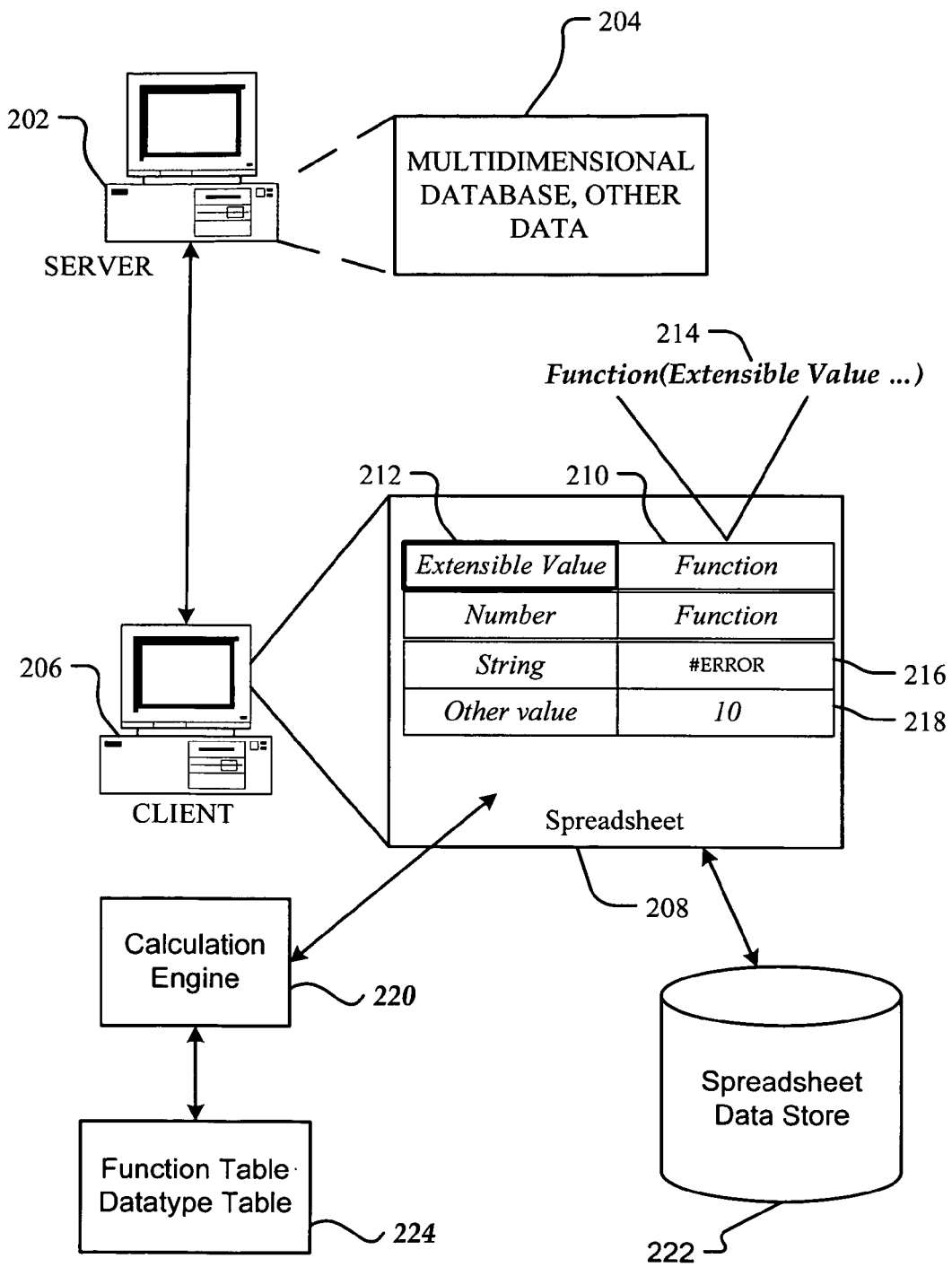
FIG. 2 illustrates an overview of a spreadsheet system that interacts with extensible values.

FIG. 2 illustrates an overview of a spreadsheet system 200 that interacts with extensible values, in accordance with aspects of the invention. Client 206 includes a spreadsheet application 208. Spreadsheet application 208 includes spreadsheet cells 210. Typically, an active cell 212, which is highlighted by the dark border, is the cell within the spreadsheet that is currently being acted upon. For example, the user is entering an extensible value into the cell. Zero or more of the spreadsheet cells may contain an extensible value of an extensible value type that has been defined and includes at least one function to operate on the extensible value type. The extensible values are acted upon in a substantially similar manner as compared to the spreadsheets base types such as: strings; numbers; errors, and the like.

Generally, a user may enter extensible values within one or more of the cells within spreadsheet 208. Functions, such as function 210, may be included within one or more of the cells to act upon the extensible values. For example, function 210 which is a function supporting an extensible value type, may be included in spreadsheet 208. The cells within the spreadsheet that contain an extensible value behave as any other cell within the spreadsheet that contains a single value. The extensible value is the true value. In other words, metadata does not need to be accessed to determine the value nor does another cell have to be referenced to obtain the value.

The spreadsheet application stores and manipulates items in a spreadsheet, such as spreadsheet 208. In one embodiment, the spreadsheet application stores the spreadsheet data 208 in a spreadsheet data store 222. The spreadsheet data store 222, in some embodiments, is a cell table.

The calculation engine 220, as described above, is a component that is associated with the spreadsheet application that can perform operations. The operations may be mathematical, such as summation, division, multiplication, etc., or may include other functions or features, such as the MICROSOFT PIVOTTABLE dynamic views feature. The calculation engine 220 is configured to process the extensible values in the same manner as the supported base values. As such, each function that is associated with the spreadsheet application may be stored in a function table 224. According to one embodiment, every function that may manipulate the data within the spreadsheet is located within the function table 224 including the base functions. Alternatively, the functions may be split among various stores. Function table 224 may also include a data type table that includes a list of the supported data types, including both the base data types and the defined extensible data types.

As illustrated, system 200 may also include server 202 that is coupled to client 206. Among other uses, server 202 may be configured to store a multidimensional database, such as an OLAP database. Communication between the spreadsheet application and the OLAP database 204 may be accomplished using MDX. Server 202 may also be configured to store other data that relates to one or more extensible values that is contained within the spreadsheet.

Figure 3:
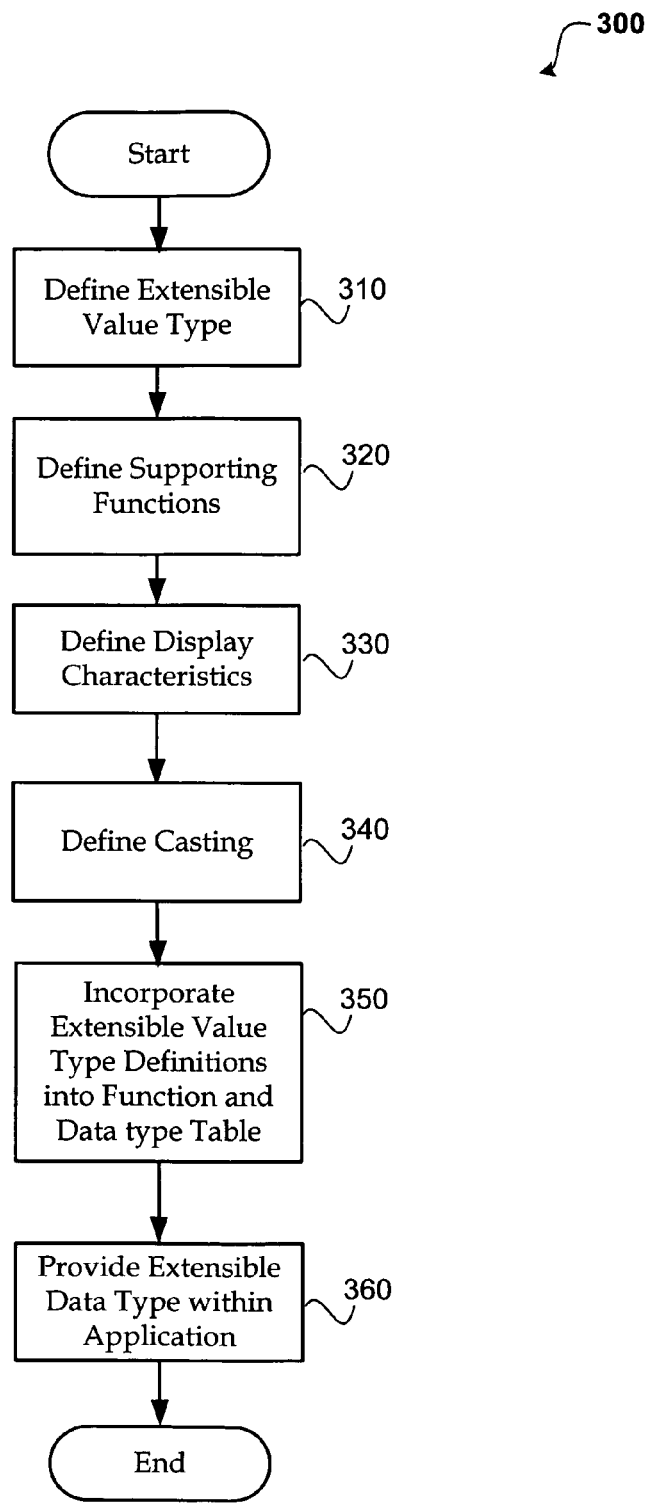
FIG. 3 shows a process for adding an extensible value type and associated functions to a spreadsheet.
Figure 4:
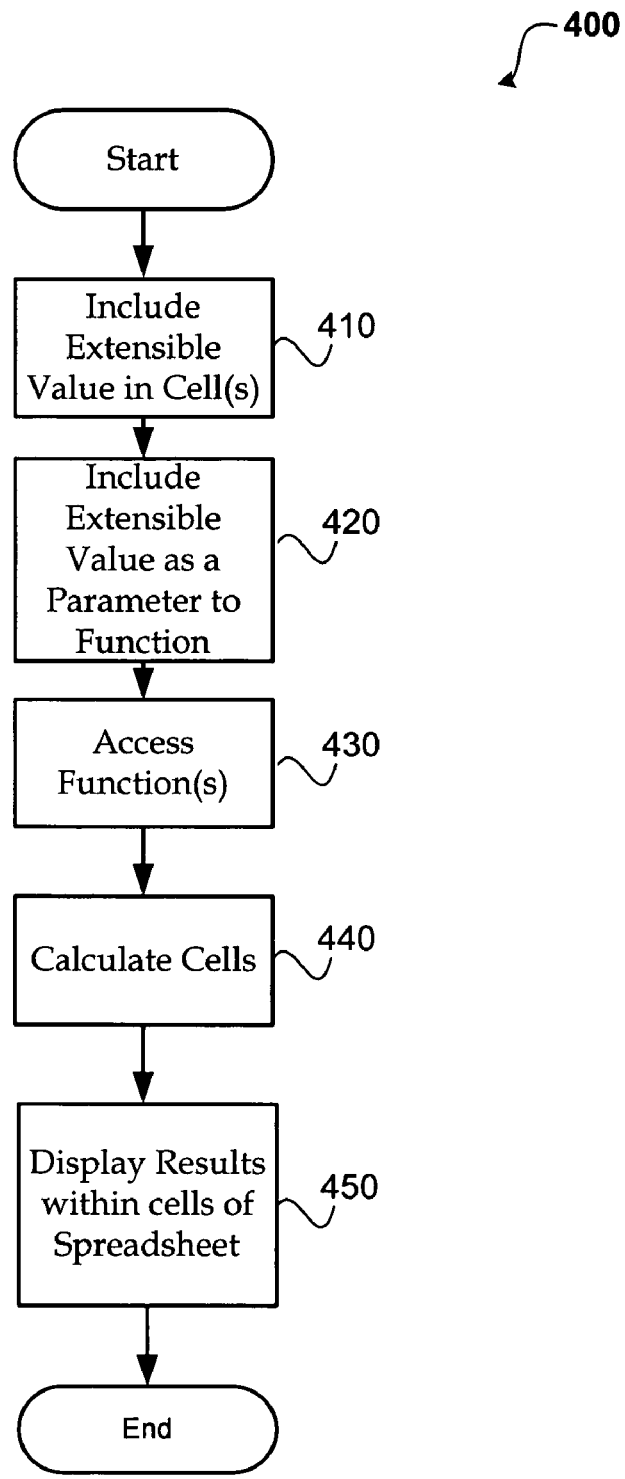
FIG. 4 displays a process for using extensible value types within a spreadsheet.

FIGS. 3 and 4 illustrate processes for interacting with extensible value types within cells.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments of the described herein are referred to variously as operations, structural devices, acts or modules. These operations, structural devices, acts and modules may be implemented in software, in firmware, in special purpose digital logic, and any combination thereof.

FIG. 3 shows a process for adding an extensible value type and associated functions to a spreadsheet.

After a start operation, the process flows to operation 310, where an extensible value type is defined. An extensible value type may be almost any type of value that is not already supported by the base types included within the spreadsheet application. For example, an economist or a financial advisor may define an extensible value type for a yield curve and functions that perform operations on yield curves (values of a yield curve data type). A mathematician may define extensible value types for complex numbers, matrices, vectors, and the like, and extend a spreadsheet's mathematical functions to operate on these new data types correctly. A banker may define an extensible value types for different monetary units (See example above). Graphic programmers may define a picture data type and functions for performing operations on pictures. Programmers may define extensible value types to work with XML: XLM nodes, a portion of an XML tree, or an XPath Query statement, and operations that work on these. Extensible value types may also be defined to work with OLAP cube data. For example, an extensible value type may be defined for MDX members, KPI indicators, tuples, sets and the like. Many other value types may also be defined. As can be seen, the possible list of extensible value types is unlimited.

Moving to operation 320, functions are developed to manipulate the extensible values for the extensible value data type. The functions to manipulate the extensible values may be developed using many different programming languages. For instance, Visual Basic, C, or C# may be used to develop the functions. Generally, any number of functions may be developed to interact with the extensible values. According to one embodiment, the functions may override base operators such as the +,-,/, * and & operators such that extensible values may utilize these operators. For example, the plus "+" operator can be overridden to add the two or more extensible values. Another example, would be overriding the minus "−" operator such that one extensible value is subtracted from another.

For example, suppose that an extensible value type is defined to manipulate complex numbers. One of the functions that may be defined to manipulate the complex number extensible values would be an addition operation, such as: (3+2i)+(4−1i) with the result being (7+i). Similarly, suppose that an extensible value type is defined for numbers with units, so that 3 m/s * 5 s would give the result 15 m. As can be seen, an extensible value is a value, and may be the result of an intermediate sub-formula, with no associated cell at all.

To represent a value within the spreadsheet may be represented by a data structure called an OPER. The following is an exemplary representation of the OPER that may include an extensible value data type:

```
struct { tag: {Error, Number, Text},
    value: union { ...error value representation...,
        ... number representation...,
        .. text representation },
    extensibleValue: *ExtensibleValue } OPER
```

According to one embodiment, the first two fields are the field that support the base types. The third field "extensibleValue" is null for all ordinary base values. But for extensible values, the extensibleValue field points to an ExtensibleValue object, which, according to one embodiment supports the following interfaces: DisplayYourself( );PopUpViewer( ); and GetValue( ). The DisplayYourself( ) method defines how the extensible value is to be displayed within the cell. The PopUpViewer( ) method defines how the extensible value is to be displayed and edited when fully displayed. The GetValue( ) method returns an OPER that can be used by the spreadsheet functions that don't understand the extensible value types.

A numeric value may be represented by {Number, 3}, while #DIV0 might be represented by {Error, 7}, where 7 is the internal code for divide-by-zero.

The calculation chain processes OPERS. For example, consider the formula: =SQRT( A1/A2 ). The calculation engine first calculates A1 and A2. A1 and A2 now have up-to-date values with each represented by an OPER. The calculation engine takes these two OPERS and divides them producing a new OPER which represents the result. This result OPER might be an error-value OPER or a numeric OPER, depending on whether divide by zero happens. Then it passes this OPER to SQRT, which constructs a new OPER as its result.

Consider an example involving extensible types. Suppose an MDX member is one of the new extensible values types that are desired to be added. For that, there is an object of class MDX_Member, a subclass of ExtensibleValue. The class has private fields for the caption and the unique MDX name of the member. The GetValue method of the MDX_Member class returns a Text OPER, with the "value" field set to the caption of the MDX member, and the extensibleValue field set to the MDX_Member object. In that way, the existing spreadsheet functions see just the Text OPER, but any MDX-aware function can look in the extensibleValue field to see the MDX_Member object. The ExtensibleValue object *is* the value; the OPER wrapper just caches the result of a function that returns the value, such as the GetValue call on that value.

Moving to operation 330, display characteristic for the extensible value type are defined. The display characteristics define how the extensible value should be displayed within a cell and how the extensible value is viewed and edited. According to one embodiment, the developer defines how the extensible value displays itself within a cell (DisplayYourself( )" and how the extensible value is viewed edited (PopUpViewer( ). For example, for a picture extensible value the DisplayYourself( ) definition may specify to show an icon of the picture within the cell. The PopUpViewer( ) definition specifies how the extensible value is viewed and edited. According to one embodiment, when a user selects the extensible value representation within the cell, the viewer defined by the PopUpViewer( ) definition is displayed to the user. For many extensible values, such as a standard image type, a viewer and editor may be readily available that may be used to interact with the extensible value that is contained within one or more cells. Generally, the display of the extensible value is left to the developer (See FIG. 5 and related discussion).

Flowing to operation 340, the definitions may include how the extensible values should be treated by the base formulas supported by the spreadsheet. As discussed above, an extensible value may be included within a formula that does not understand the extensible value and only operates on supported base values. For example, suppose that an extensible value (MyList) is included in a Sum formula, such as: =Sum( Filter( MyList, . . . ); where MyList is a new List value, and Filter consumes MyList producing a new (smaller) list as its result. The "old" function Sum expects to receive an array value type as its argument, but it is given a List value type. According to one embodiment, whenever a function or formula receives a value that it is not expecting, the argument is "down-cast" to the type of value it is expecting. In the current example, the My List value is cast to an array type. In this situation, the definition of the My List value type includes the operation to cast the list value type to the array type.

For another example, suppose that an individual cell, such as A3 contains an extensible MDX member value, such as: =A3 & "Wubble." The supported base string-concatenation operation "&" expects its arguments to be strings. In this example, however, the value of A3 is an extensible MDX member value type. If the & operator is not overridden by the MDX member extensible definition, the MDX member value is down-cast to a string according to the supplied definition. For example, the definition could state that when a string is expected, return the MDX member name.

According to one embodiment, the down-cast is done ahead of time, so that any functions that are ignorant of the extensible value see a supported value, and can use that value in the operations. In this way, the base function continues to work in some fashion. According to another embodiment, the down-cast is not done ahead of time. In this case, the calculation engine could down-cast just before it calls the base function.

At operation 350 the extensible value type definitions and supporting functions are incorporated into the spreadsheet application. The functions are included within the application such that they may be accessed in the same manner as the base functions. According to one embodiment, the definitions may be incorporated into a table and accessed when invoked.

Transitioning to operation 360, the spreadsheet application provides access to the extensible data types and supporting functions. In this way, any user could include the supported extensible value data types within their spreadsheet in the same manner as including a text string, a number, and the like.

The process then moves to an end block and returns to processing other actions.

FIG. 4 displays a process for using extensible value types within a spreadsheet, in accordance with aspects of the invention. After a start operation, the process flows to define operation 410, where at least one extensible data value is included within a cell of the spreadsheet. The extensible value is displayed according to the DisplayYourself( ) definition that is included with the extensible value type definition.

Moving to operation 420, at least one formula within the spreadsheet includes an extensible value as one of its parameters. The formula may call a function that has been developed specifically for the extensible value data type and/or the formula may call a function that is expecting a different value type. In order for a formula to produce a result that does not understand the extensible value data type, a definition is provided to cast the extensible value data type to one of the supported data types for the function Flowing to operation 430, the function including one or more extensible values is accessed. According to one embodiment, the function is located within a function table.

Moving to operation 440, the spreadsheet is evaluated. The spreadsheet is evaluated based on the functions located and the values that are contained within the cells. In this way, each cell containing an extensible value may be acted upon properly by the function.

At operation 450, the results of the queries and any calculations that were performed may be displayed to the user. Where a cell contains an extensible value, this display is carried out by the DisplayYourself( ) method of the extensible value, and is thus completely under the control of the user who develops the extensible type. The process then moves to an end block and returns to processing other actions.

Figure 5:
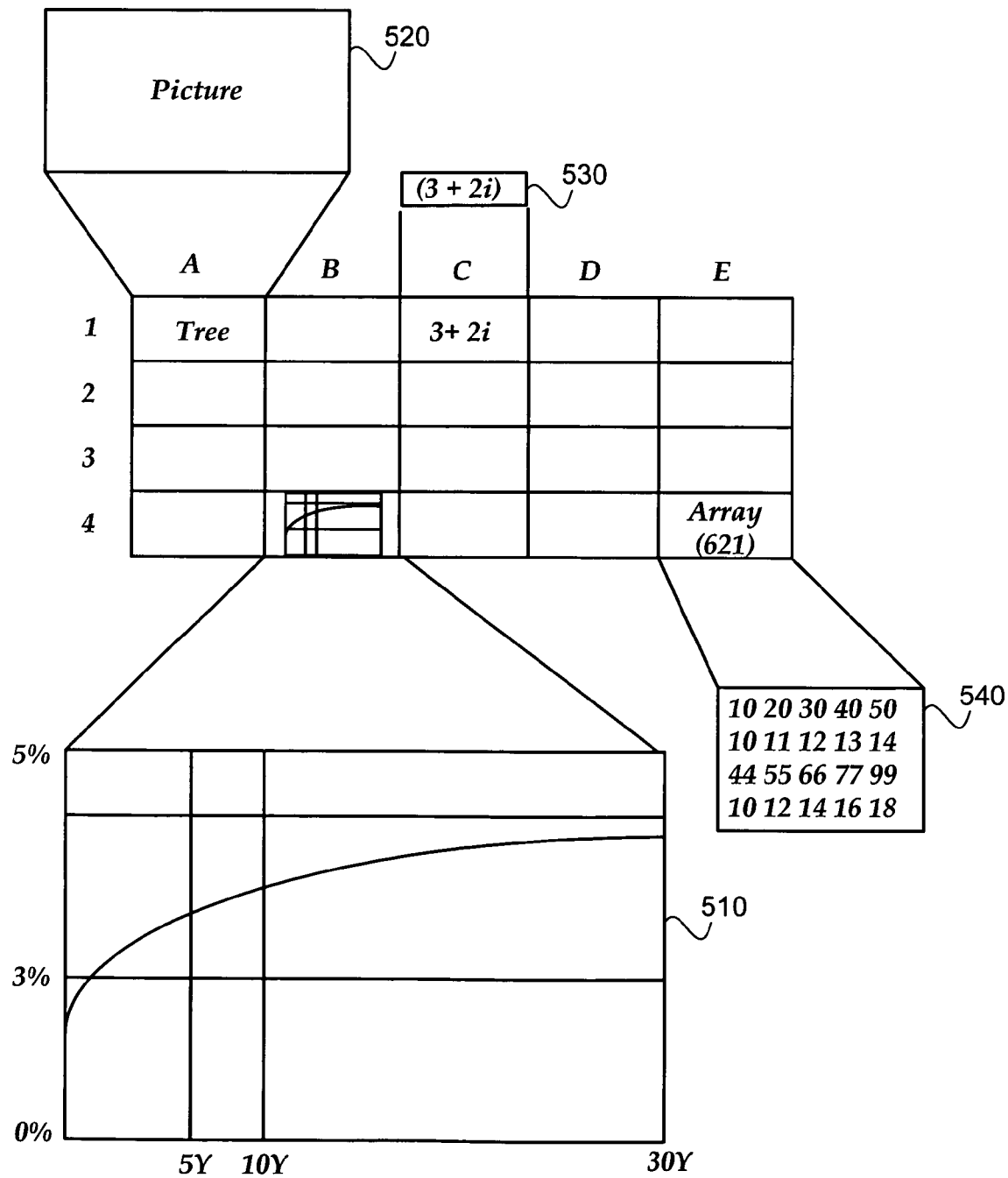
FIG. 5 illustrates the display, viewing, and editing of extensible values, in accordance with aspects of the present invention.

FIG. 5 illustrates the display, viewing, and editing of extensible values. As the number of extensible values that may be defined and utilized within a spreadsheet is unlimited, the extensible values shown in FIG. 5 are for illustrative purposes only and are not intended to be limiting.

Cell B4 of the spreadsheet illustrates an extensible value that relates to yield curves. The display of the yield curve extensible value has been defined by the DisplayYourself( ) method such that is shows a graphical icon display of the larger yield curve. When cell B4 is selected, a pop up viewer displays the yield curve 510. Once the yield curve 510 is displayed the user may manipulate the yield curve as desired.

Cell A1 of the spreadsheet shows an extensible value that relates to a picture. In this example, the picture extensible value is displayed within the cell as a text description of the picture. When cell A1 is selected, the picture 520 is displayed to the user.

Cell C1 of the spreadsheet illustrates an extensible value that relates to complex values. The display of the complex value extensible value has been defined by the DisplayYourself( ) method such that is shows the complex value. When cell C1 is selected, a pop up viewer may display the complex value 530. Alternatively, the DisplayYourself( ) and PopUpViewer( ) definitions may use the standard spreadsheet viewers for viewing and manipulation In this situation, the complex value could be manipulated by simply typing in text at the cell.

Cell E4 of the spreadsheet illustrates an extensible value that relates to an array. The display of the array extensible value has been defined by the DisplayYourself( ) method such that is shows the fact that the extensible value is an array as well as a representative value of the array. In this example, the developer defined the representative value to be the sum of the values that are contained within the array. When cell E4 is selected, a pop up viewer displays the array 540. Once the array 540 is displayed the user may manipulate the array as desired.

As can be seen by this example, extensible values may be displayed within a cell many different ways and may be viewed and edited using a variety of methods. The developer that defines the extensible value type may determine the best way to represent the extensible value within the cell, as well as the best way to view and edit the extensible value.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for operating on extensible values, comprising:

obtaining an extensible value directly from a cell of a spreadsheet that is a true value such that the cell itself contains the value; wherein the extensible value is one of an extensible value data type; wherein base objects and the extensible value objects are defined using a same data structure, wherein the same data structure includes an extensible value data field that points to the extensible object when an extensible value object is defined and is null when base objects are defined; and performing an operation involving the extensible value; wherein the extensible value is treated similarly to base values; wherein each function that manipulates data within the spreadsheet is located within a function table that includes base functions and functions relating to the extensible value data type; wherein all of the functions relating to the extensible value data type that are included within the function table are defined by a third-party developer; wherein the extensible value type defines a definition describing how to display a representation of the extensible value data type within the cell of the spreadsheet and a definition describing how to display a user interface element external from the cell that is used to show the extensible value.

2. The computer-implemented method of claim 1, further comprising displaying the extensible value within a viewer when the extensible value is selected; wherein the viewer may be used to view and edit the extensible value.

3. The computer-implemented method of claim 2, wherein the extensible value provides associated functions and a behavior for how the extensible value behaves when consumed by a function that does not understand the extensible value.

4. The computer-implemented method of claim 1, wherein performing the operation involving the extensible value comprises casting the extensible value to a supported base type when the extensible value is not supported by the operation.

5. The computer-implemented method of claim 4, wherein casting the extensible value comprises casting the extensible value to one of: a string type; an error type; and a number type.

6. The computer-implemented method of claim 4, wherein casting the extensible value comprises casting the extensible value before the operation is requested to be performed.

7. The computer-implemented method of claim 1, further comprising accessing the extensible value from an object defined by an operator.

8. The computer-implemented method of claim 1, further comprising connecting to a multidimensional database and obtaining data from the multidimensional database that relates to the extensible value.

9. The computer-implemented method of claim 1, further comprising providing a display definition for the extensible value data type.

10. A computer-readable storage medium having computer-executable instructions for interacting with extensible values within a spreadsheet, comprising:
    defining an extensible value object; wherein the definition of the extensible value object comprises a definition describing how to display the extensible value object within the cell of the spreadsheet and a definition of how to display the extensible value data type when fully displayed within a pop-up viewer; wherein base objects and the extensible value objects type are defined using a same data structure, wherein the same data structure includes a data field that points to the extensible value when the same data structure is used to support the extensible value object is defined and is null when base objects are defined;
    including an extensible value defined by the extensible value data type within a cell of the spreadsheet;
    performing an operation involving the extensible value; wherein the operation is performed by at least one of: a base function and a function defined by a third party to operate on the extensible value data type; wherein the third party defined function is located within a function table that also includes the base function and wherein the third party defined function comprises all of the functionality to perform the operation involving the extensible value.

11. The computer-readable storage medium of claim 10, wherein defining the extensible value comprises defining a list of functions that perform at least one operation using the extensible value.

12. The computer-readable storage medium of claim 11, wherein defining the extensible value comprises defining a behavior for the extensible value when the operation performed does not understand the extensible value.

13. The computer-readable storage medium of claim 12, wherein casting the extensible value comprises casting the extensible value to one of: a string type; an error type; and a number type before the operation is requested to be performed.

14. The computer-readable storage medium of claim 11, further comprising defining a manner of displaying the extensible value within a cell; and defining a viewer that is used to view and edit the extensible value.

15. The computer-readable storage medium of claim 10, wherein performing the operation involving the extensible value comprises casting the extensible value to another type of value.

16. A system for interacting with extensible values from a spreadsheet, comprising:
    a processor that is configured to perform operations;
    a spreadsheet application that is coupled to a network and is configured to perform steps, comprising:
    including an extensible value directly within a cell of the spreadsheet; wherein the extensible value is displayed within the cell according to a definition describing how to display the extensible value data type within the cell of the spreadsheet defined with a definition of an extensible value data type that corresponds to an instance of the extensible value; wherein base objects and the extensible value objects are defined using a same data structure, wherein the same data structure includes a data field that points to the extensible value object when an extensible value object is defined and is null when base objects are defined; and
    performing an operation involving the extensible value on the processor; wherein the extensible value may be consumed by a base spreadsheet operation and wherein the extensible value data type comprises third party developed functions that operate on the extensible value and are wherein all of the third party developed functions are stored with the base functions defined by the spreadsheet application.

17. The system of claim 16, wherein the spreadsheet application is further configured to determine a set of functions that perform at least one operation using the extensible value.

18. The system of claim 17, wherein the spreadsheet application is further configured to cast the extensible value to another type in response to a type expected by the base spreadsheet function.

19. The system of claim 17, further comprising a display; wherein the display is configured to display a representation of the extensible value within a cell according to a display definition and display the extensible value within a viewer such that the extensible value may be viewed and edited in its entirety.

20. The system of claim 17, wherein casting the extensible value comprises casting the extensible value to one of: a string type; an error type; and a number type before the operation is requested to be performed.

* * * * *